Aug. 5, 1952 H. L. LESIGNE 2,606,243
SYSTEM FOR RECEPTION OF CODED SIGNALS
Original Filed Aug. 4, 1947
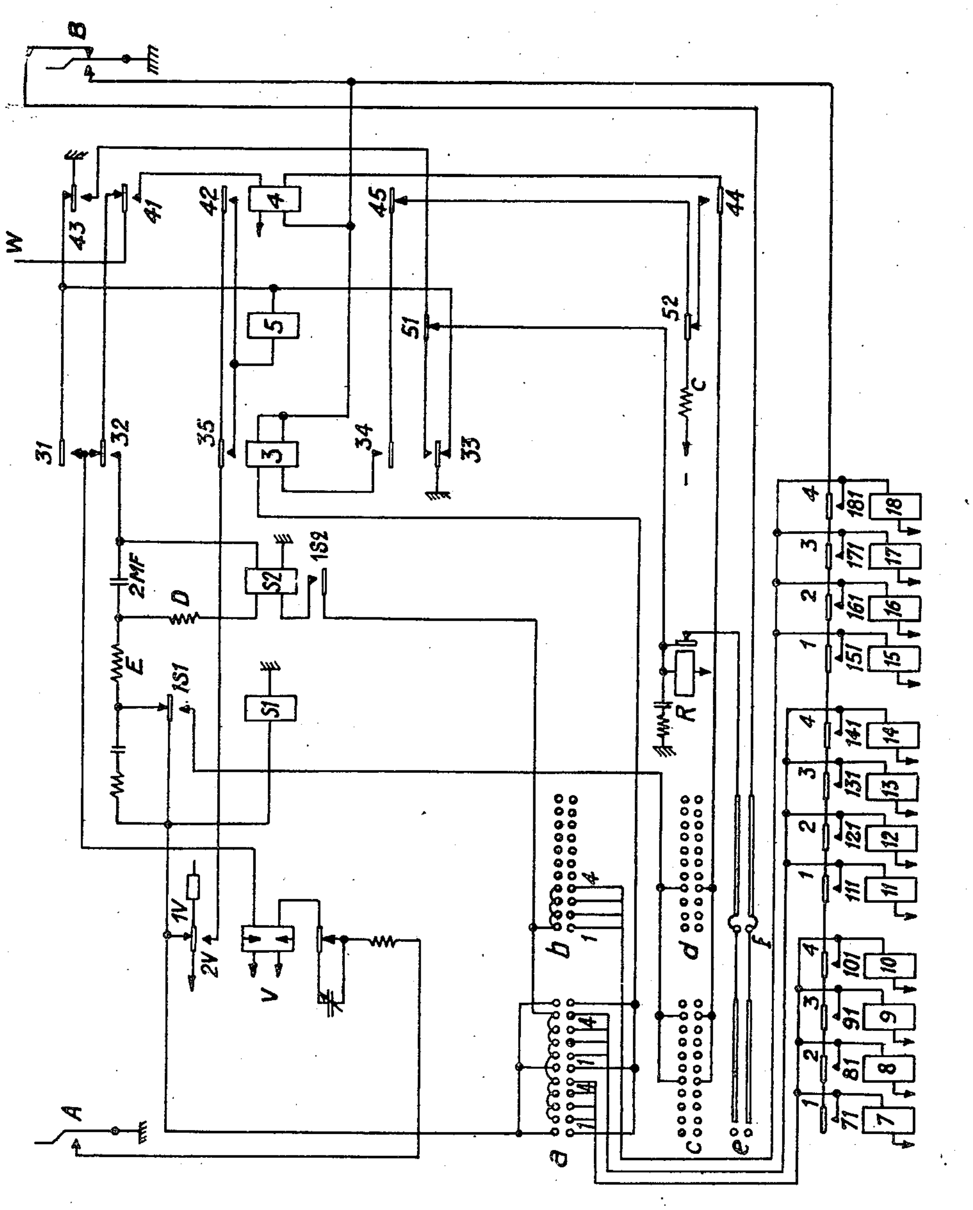
Inventor:
Henri Louis Lesigne
By D Malcolm
Attorney Patented Aug. 5, 1952

2,606,243

UNITED STATES PATENT OFFICE 2,606,243

SYSTEM FOR RECEPTION OF CODED SIGNALS

Henri Louis Lesigne, Vanves, France, assignor to Compagnie Industrielle des Telephones, Paris, France Original application August 4, 1947, Serial No. 765,840. Divided and this application December 23, 1949, Serial No. 134,661. In France September 6, 1946

3 Claims. (Cl. 177—353)

This application is a division from my copending application Serial No. 765,840, filed August 4, 1947 and now abandoned.

This invention relates to electrical signaling systems and has for its object to provide a novel and improved system for the reception of coded signals.

Another object of the invention is to reduce the time required for the transmission of call signals or dialing impulses in a system of the above type.

Another object is to provide a signaling system of the type specified which may utilize any desired code and is particularly adapted for use in telephony.

Still another object is to facilitate the faithful reception of call signals or the like which may have undergone considerable distortion in transmission.

Various other objects and advantages will be apparent as the nature of the invention is more fully disclosed.

In the course of establishing a telegraphic or telephonic communication, the office which receives a call number sent by a subscriber of its zone may have to retransmit a number to a second distant exchange.

If the establishment of the communication involves transmitting to several intermediate exchanges, this second exchange must, in turn, retransmit the number received to a third exchange and so on.

When the call numbers are sent and retransmitted, according to the usual method, in the form of dialing impulses, the average time necessary for the retransmission of a digit is 900 milliseconds. If there are several successive retransmissions, the total time necessary for the transmission of a call number becomes important with regard to the duration of the communication proper, so that the circuits are badly utilized and their output is low.

The present invention provides a system which avoids the foregoing disadvantages of the prior art and which, in particular, permits the use of any code, including those different from the international telegraph code, and more particularly adapted for use in telephony. It also permits by means of a rapid analysis of the polarity of each characteristic period of the signals and the use of a pendulum relay, the correct reception of signals which have undergone considerable distortion.

The device according to the invention is characterized by the fact that it comprises, in the register, a pendulum relay, which marks the middles of the characteristic periods of different polarities, and successively controls, at these moments, registering relays each allotted to one of these characteristic periods, so as to energize those which correspond to periods of negative polarity, for example, and to leave idle those which correspond to periods of positive polarity.

Although the novel features which are characteristic of this invention are set forth more in detail in the claims appended hereto, the nature and scope of the invention may be better understood by referring to the following description, taken in connection with the accompanying drawings forming a part thereof, in which certain specific embodiments have been set forth for purposes of illustration.

The drawing represents an embodiment according to a code more particularly adapted to telephony.

This example is given purely indicatively to facilitate understanding of the invention, but is in no way limiting; in particular, the use of any other code based on the same principle will come within the scope of the invention.

In the following description certain specific terms are used for convenience in referring to the various details of the invention. These terms, however, are to be interpreted as broadly as the state of the art will permit.

The drawing shows the circuit for reception of signals in accordance with a code more particularly adapted to telephony.

The method of retransmission of the digits of the call number is based on the "start-stop" principle employed in telegraphy, but with this difference that, instead of employing for the transmission of the signal characterizing a digit, seven time intervals of duration equal to 20 milliseconds, only six time intervals are used of duration equal to 50 milliseconds as follows:

1st interval, start
2nd interval }
3rd interval } Characteristic transmission
4th interval } of the digit
5th interval }
6th interval, stop The total duration of the signal characterizing a digit is thus equal to 300 milliseconds.

Current may be sent or not sent during each of the 2nd to 5th intervals, depending on the digit transmitted.

Current is always sent during the first interval (start) and is never sent during the sixth interval (stop).

The receiving device is composed of:

1. A pendulum relay V.
2. A sensitive relay S1 determining the time of cutting off the signal.
3. A sensitive relay S2 controlling the operation of the registering relays.
4. A rotary switch R distributing the signals on the different registering relays of each digit.
5. Three auxiliary relays 3, 4, 5.
6. Three groups of registering relays, one group per digit (7 . . . 18).

The transmission wire terminates in 41 and 32, on the second winding of the pendulum relay V. The first winding of this latter has its circuit closed by the key A. When the device is in the normal position upon the key A being depressed, the pendulum relay V is energized and blocks the oscillating reed.

As soon as the "start" is received the second winding of the pendulum relay acts in opposition to the first and causes the falling of this relay. The adjustment is such that the unblocking of the oscillating plate is effected so as to permit the establishment of the contact 1V exactly 25 milliseconds after the appearance of the "start," i. e., in the middle of this latter signal. The relay 3 is energized:

Battery, 1V, contact 1 of the arc *a* of the rotary switch R, upper 500 ohm winding of the relay 3, earth by the key B.

The relay 3 is maintained by its lower winding: Battery, 500 ohm resistance C, 45, 34, lower 1000 ohm winding, earth at key B.

The receiving wire W is switched by 32 on to the cut-off circuit:

Receiving wire, 41, 32 upper winding of the relay S2, across whose extremities a 2 mf. condenser is shunted 1200 and 50-ohm resistances D and E respectively, contact 1S1, contact 1V and battery. Further the relay 3 arms the electromagnet R: Battery R, 51, 53, earth, and maintains closed the circuit of the second winding of the pendulum relay V: Battery, second winding of V, 31, 43, earth.

When the oscillating reed returns to its original position, the relay 5 is energized over 35 and 43 and opens at 51 the circuit of electromagnet R, causing the rotary switch to advance to position 2.

At the moment when the oscillating reed establishes the contact 1V for the second time, i. e., in the middle of the time interval during which the first characteristic sign of a digit may be transmitted, the 2 mf. condenser is connected to the battery at the same time that the circuit of S1 is closed. The later, in being energized, opens the cut-off circuit. The time necessary for relay S1 to open its contact is of the order of 0.6 millisecond. It is sufficient for the condenser to be able to receive the charge if the receiving wire W was earthed, i. e., if a signal was transmitted during this time interval. In the latter assumption the condenser is discharged through the upper winding of relay S2, which is maintained by its lower winding in series with the first marker relay of the first group, which is the relay 7 connected to the contact 2 of bank *a*. The relay 7 is energized and maintained by its own contact 71. It thus short-circuits the second winding of the relay S2 which falls back.

This arrangement means that the cut-off may be very rapid, since it is only limited by the time necessary for a 2 mf.-condenser to be charged; on the other hand, despite the speed of cutting-off, the retransmission of the signal on the marker relay is made with complete certainty since it is the energization of marker-relay 7 itself which causes the release of the relay S2 by short circuiting its winding at 71 between the earth connected to its lower winding and the earth of key B.

It appears from the above considerations that the role of condenser 2 mf. is only to impart to relay S2 an operating time smaller than that of relay S1. Condenser 2 mf. could therefore be dispensed with if relay S2 were so designed as to have an operating time smaller than that of relay S1.

The operation above explained with respect to position 2 is repeated in positions 3, 4, and 5 of the rotary switch, of which the advance is controlled by the relay 5, itself controlled by the contact 2V.

The relays 8, 9, 10 presented successively in those positions mark currents, if any, which are received.

In position 5 of the rotary switch, the relay 4 is energized:

Battery, 1V, 1S1 contacts 5 of the bank *c*, 500 ohm, lower winding of relay 4, earth by the key B.

The relay 4 determines the end of reception of the signals characterizing a digit by opening its contact 41. It opens at 43 the circuit of the second winding of the pendulum relay so that the latter may be re-armed, relay 4 is maintained by:

Battery, 500 ohm resistance C, 52, 44, 500 ohm winding of relay 4, earth by the key B.

At the same time, its second winding is connected by 41 to the receiving wire.

The relay 3 falls back, its circuit being cut-off by 45. When the contact 2V is re-established, the relay 5 is re-energized:

Battery, 2V, T 42, relay 5, earth by R 33, and causes the rotary switch to advance to position 6. The relay 4 falls back when its holding-circuit of the 500 ohm winding is cut-off at 52 since no current is sent over wire W during the sixth (stop) signal and the other winding of relay 4 is therefore not energized.

The relay 5 falls back after the relay 4, and the reception of the second digit may take place. The operation is renewed every six positions. By employing a rotary switch of $n \times 5$ positions, it is possible to receive a call number with $n$ digits.

I claim:

1. In a device responsive to coded signals comprising moments of equal duration, each of which is characterized by the flow or the absence of current: a line over which the signals are transmitted; a battery having a first pole and a second pole; a pendulum having an energizing winding connected to said line, a vibrating blade connected with said first pole and a contact which is closed by said vibrating blade substantially at the middle of each moment; a first relay having a winding and an armature; a connection between said armature and said contact; a connection between one extremity of said winding and said contact; a connection between the other extremity of said winding and said second pole; a second relay faster operating than said first relay and having an energizing winding and a holding winding; a connection between one extremity of said energizing winding and said contact of said first relay; a connection between the other extremity of said energizing winding and said line; and means for energizing said holding winding after said second relay has operated.

2. A device according to claim 1 comprising a condenser shunted on said energizing winding of said second relay.

3. A device according to claim 1 comprising a registering relay having an energizing winding through which passes said holding circuit of said second relay, said registering relay being held in energized condition by said energizing winding.

HENRI LOUIS LESIGNE.

REFERENCES CITED

The following references are of record in the file of this patent:

UNITED STATES PATENTS

| Number | Name | Date |
|---|---|---|
| 2,468,065 | Hartley et al. ______ | Apr. 26, 1949 |